Sept. 23, 1924.
J. L. CREVELING
ELECTRIC REGULATION
Filed Nov. 4, 1919
1,509,397
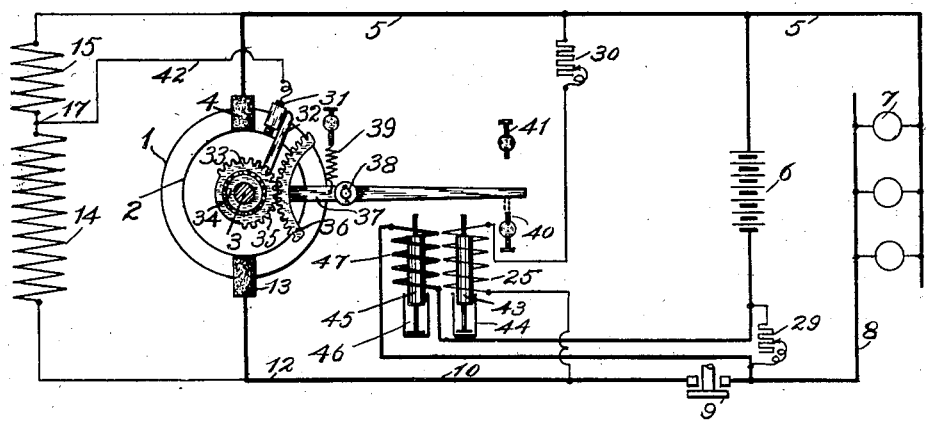
INVENTOR
John L. Creveling Patented Sept. 23, 1924.

1,509,397

UNITED STATES PATENT OFFICE.

JOHN L. CREVELING, OF TUCSON, ARIZONA, ASSIGNOR TO GOULD COUPLER COMPANY, A CORPORATION OF NEW YORK.

ELECTRIC REGULATION.

Application filed November 4, 1919. Serial No. 335,616.

*To all whom it may concern:*

Be it known that I, JOHN L. CREVELING, a citizen of the United States, residing at Tucson, county of Pima, and State of Arizona, have invented certain new and useful Improvements in Electric Regulation, of which the following is a description.

My invention pertains to that class of regulation wherein a dynamo electric machine is to be regulated in a predetermined manner and comprehends means whereby such regulation may be carried out automatically, if desired.

As my invention is particularly applicable to systems employing a dynamo driven at varying speeds which operates to supply translating devices and charge a storage battery which at times supplies the said devices, it will be described with particular reference to such systems.

This application is a continuation of my application for improvements in electric regulation, filed February 3, 1917, Serial No. 146,412.

The drawing is a diagrammatic representation of one type of such system illustrating one embodiment of my invention.

In the drawing, 1 represents the armature of a dynamo or generator provided with a commutator 2 and carried upon a shaft 3, supported in any suitable manner and subjected to speed changes in its rotation. The brush 4, which may be considered as the positive brush of the dynamo, is connected to the lead 5 which is connected with the positive side of the storage battery 6 and the positive terminals of the translating devices 7, as indicated. The storage battery 6, through coil 47, and the translating devices 7 have their negative terminals connected with the lead 8 which is carried to one side of the automatic switch 9, the opposite side of which is connected as by lead 10 with the negative brush 13. The commutator 2 is shown as provided with a brush 31 which may have its position altered with respect to the brushes 4 and 13, and in this instance is illustrated as insulated from and carried by the arm 32 mounted upon the outer ring 33 of an ordinary ball-bearing, the inner ring 34 of which may be carried upon the shaft 3 or mounted in any suitable manner so as to be concentric with said shaft. The outer portion of the ring 33 is provided with teeth 35 engaging a toothed arc 36, carried by the lever 37, pivoted as at 38. The lever 37 is provided with a spring 39 tending to swing the same in a clockwise direction about the pivot 38, and thus revolve the brush 31 in a counter-clockwise direction. 40 is an adjustable stop whereby the motion given the lever 37 by the spring 39 may be adjusted; and 41 is a stop whereby revolution of the lever 37 in an opposite direction may be arrested. The brush 31 is connected at the point 17 with the two coils 14 and 15, as by means of wire 42. The voltage coil 25 across the leads 5 and 10 is provided with a core 43 which it tends to raise against the action of the dash-pot 44 when the said coil is energized; and the core 43 when raised sufficiently contacts with the lever 37, whereupon further raising of said core rotates the said lever in a counter-clockwise direction, and therefore moves brush 31 upon the commutator in a clockwise direction. A similar core 45, provided with a dashpot 46, is surrounded by a coil or solenoid 47, which in this instance is shown as in series with the storage battery 6 and so arranged that current flowing to the storage battery from the generator tends to raise the core 45 and, through the instrumentality of lever 37, rotate brush 31 in a clockwise direction.

The switch 9 is preferably one of the automatic type adapted to close the circuit when the voltage of the generator is substantially equal to that of the battery and open the circuit when the generator voltage falls very slightly below that of the battery, so as to prevent back discharge from the battery through the generator. As these switches are now well-known in the art the mere presence of such a switch is indicated, while details are omitted for the sake of simplicity.

While the coil 47 is shown as in series with the battery and traversed only by the current in the battery circuit, it will be obvious that the system may have its current coil in the generator circuit, if desired.

In the drawing, 14 is indicated as the main energizing field coil or means, while 15 is an auxiliary or regulating coil or means, which may have any desired effect upon the generator in addition to that of serving to assist in the control of the current through the coil 14. That is to say, the coil 15 may be upon the same core or in any other way affect the same magnetic circuit as the coil 14, and the magnetomotive force of the coil 15 may be in the same direction as that set up by the coil 14 or it may be in the opposite direction or the winding 15 may affect a different magnetic circuit than the coil 14 and perform any desired function or the winding 15 may be employed in any other manner whereby control of its excitation assists in the control of the generator beyond merely serving to assist in controlling the value of the current in the exciting coil 14, as will hereinafter be more plainly pointed out.

An operation of my invention is substantially as follows:

In the system used for illustration in the drawing, if the generator be at rest or running with its voltage below that of the battery, switch 9 will be open and the translating devices 7 may be supplied by the battery 6 in the usual manner. With the generator at rest or running at low speed, spring 39 will rotate the brush 31 in a counter-clockwise direction until lever 37 makes contact with the adjustable screw 40; and if this screw be properly adjusted, brush 31 may be swung into substantially the same plane as the brush 4 with the effect that the coil 15 will be substantially short-circuited by the wire 42. For the sake of clearness in illustration, the screw 40 is shown as so adjusted that the brush 31 is restrained from coming into the same plane as the brush 4.

If now the generator have its voltage brought up until supplying the battery and the translating devices, and the current to the battery tend to increase above a predetermined limit, coil 47 will cause the core 45 to be raised smoothy against the action of dashpot 46 and, by revolving lever 37, cause the brush 31 to be moved in a clockwise direction, with the effect that the current in the wire 42 will be reduced and the coil 14 weakened, while the coil 15 is simultaneously strengthened. And this change of relationship of the said coils may be used to regulate the generator, in such manner that the desired predetermined current in the coil 47 will not be exceeded. Should the voltage across the circuit measured by the coil 25, tend to increase above a predetermined limit, the said coil will raise the core 43, in the manner above explained with reference to the core 45, and hold a predetermined voltage across the coil from being exceeded throughout speed changes of the generator.

From the foregoing it will be noted that I have produced a system wherein regulation may be readily brought about by regulating the current in a field exciting coil of the generator, and that the means whereby the current in the said coil is regulated includes another coil or means affecting the operation of the generator. It will also be noted that both the regulating coil or means and the exciting coil or means may be simultaneously affected to produce the regulation of the generator and that a considerable saving of energy usually lost in useless heat for the mere purpose of regulation may be avoided by the use of my invention.

Throughout the above specification I have spoken of the coil 15 and the coil 14 merely to indicate that 2 single coils may be used, if desired. It is, however, within my invention to use any number of coils that may be best suited to any particular use of my invention. That is to say, the coil 14 may be replaced by any suitable number of coils in series or in multiple or any preferred type of grouping with respect to each other; while the coil 15 may be replaced by any suitable number of coils either in series, multiple or other grouping desired.

I do not wish in any way to limit myself to any of the details of construction or exact modes of operation outlined above which are given merely to portray examples of embodiments of my invention, for wide departure may be made without departing from the spirit and scope of my invention which is as set forth in the following claims:

1. The combination with a dynamo having a field energizing means and a field affecting means cooperating therewith, of means for simultaneously affecting the field exciting and field affecting means comprehending means for connecting said field energizing and field affecting means with the dynamo and varying the connection therewith.

2. The combination with a dynamo having a field energizing means and a field affecting means cooperating therewith, of means for simultaneously affecting the field exciting and field affecting means comprehending means for connecting said field energizing and field affecting means with the dynamo and varying the connection therewith responsive to fluctuations in a circuit affected by the operation of the dynamo.

3. The combination with a dynamo having a main field exciting winding and an auxiliary field exciting winding, of means for simultaneously affecting the relative energization of said windings comprehending means for connecting said windings with the dynamo and varying the connection therewith.

4. The combination with a dynamo having a main field exciting winding and an auxiliary field exciting winding, of means for simultaneously affecting the relative energization of said windings comprehending means for connecting said windings with the dynamo and varying the connection therewith responsive to fluctuations in a circuit affected by the operation of the dynamo.

5. The combination with a dynamo having a main field exciting winding and an auxiliary field exciting winding, of means for simultaneously affecting the relative energization of said windings comprehending means for connecting said windings with the dynamo and varying the connection therewith responsive to fluctuations in a circuit supplied by the dynamo.

6. The combination with a dynamo having a field winding and another field affecting winding in series therewith, of means for simultaneously affecting said windings in different degree comprehendng means for connecting said windings with the dynamo and varying the connection thereof.

7. The combination with a dynamo having a field winding and another field affecting winding in series therewith, of means for simultaneously affecting said windings in different degree comprehending means for connecting said windings with the dynamo and varying the connection thereof responsive to fluctuations in a circuit affected by the operation of the dynamo.

8. The combination with a dynamo having a field winding and another field affecting winding in series therewith, of means for simultaneously affecting said windings in different degree comprehending means for connecting said windings with the dynamo and varying the connection thereof responsive to both voltage and current fluctuations.

9. The combination with a dynamo having a field winding and another field affecting winding in series therewith, of means for simultaneously affecting said windings in different degree comprehending means for connecting said windings with the dynamo and varying the connection thereof independently responsive to voltage and current fluctuations.

10. The combination with a dynamo having a field winding and another field affecting winding in series therewith, of means for simultaneously affecting said windings in opposite senses comprehending means for connecting said windings with the dynamo and varying the connection thereof.

11. The combination with a dynamo having a field winding and another field affecting winding in series therewith, of means for simultaneously affecting said windings in opposite senses comprehending means for connecting said windings with the dynamo and varying the connection thereof responsive to fluctuations in a circuit affected by the operation of the dynamo.

12. The combination with a dynamo having a field winding and another field affecting winding in series therewith, of means for simultaneously affecting said windings in opposite senses comprehending means for connecting said windings with the dynamo and varying the connection thereof responsive to both voltage and current fluctuations.

13. The combination with a dynamo having a field winding and another field affecting winding in series therewith, of means for simultaneously affecting said windings in opposite senses comprehending means for connecting said windings with the dynamo and varying the connection thereof independently responsive to voltage and current fluctuations.

14. The combination with a dynamo having a field exciting winding and another field winding cooperating therewith, of means for affecting the current in said windings comprehending means for connecting said windings with the dynamo and means for altering said connection to change the relation of said windings with respect to the dynamo.

15. The combination with a dynamo having a field exciting winding and another field winding cooperating therewith, of means for affecting the current in said windings comprehending means for connecting said windings with the dynamo and means for altering said connection to change the relation of said windings with respect to the dynamo responsive to fluctuations in a circuit affected by the operation of the dynamo.

16. The combination with a dynamo having a field exciting winding and another field winding cooperating therewith, of means for affecting the current in said windings comprehending means for connecting said windings with the dynamo and means for altering said connection to change the relation of said windings with respect to the dynamo responsive to both voltage and current fluctuations.

17. The combination with a dynamo having a field exciting winding and another field winding cooperating therewith, of means for affecting the current in said windings comprehending means for connecting said windings with the dynamo and means for altering said connection to change the relation of said windings with respect to the dynamo independently responsive to voltage and current fluctuations.

18. The combination with a dynamo having a field exciting winding and another field winding cooperating therewith, of means for affecting the current in said windings comprehending means for connecting said windings with the dynamo and means for altering said connection to change the relation of said windings with respect to the dynamo and with respect to each other.

19. The combination with a dynamo having a field exciting winding and another field winding cooperating therewith, of means for affecting the current in said windings comprehending means for connecting said windings with the dynamo and means for altering said connection to change the relation of said windings with respect to the dynamo and with respect to each other responsive to fluctuations in a circuit affected by the operation of the dynamo.

20. The combination with a dynamo having a field exciting winding and another field winding cooperating therewith, of means for affecting the current in said windings comprehending means for connecting said windings with the dynamo and means for altering said connection to change the relation of said windings with respect to the dynamo and with respect to each other responsive to both voltage and current fluctuations.

21. The combination with a dynamo having a field exciting winding and another field winding cooperating therewith, of means for affecting the current in said windings comprehending means for connecting said windings with the dynamo and means for altering said connection to change the relation of said windings with respect to the dynamo and with respect to each other independently responsive to voltage and current fluctuations.

22. The combination with a dynamo having a field exciting winding and another field affecting winding in series therewith, of means for connecting said windings across the dynamo at a point of adjustable potential difference, the arrangement of said coils being such that adjustment of said connection point varies the mutual relation of said windings.

23. The combination with a dynamo having a field exciting winding and another field affecting winding in series therewith, of means for connecting said windings across the dynamo at a point of adjustable potential difference, the arrangement of said coils being such that adjustment of said connection point varies the mutual relation of said windings, and means for adjusting said point of connection responsive to fluctuations in a circuit affected by the operation of the dynamo.

24. The combination with a dynamo having a field exciting winding and another field affecting winding in series therewith, of means for connecting said windings across the dynamo at a point of adjustable potential difference, the arrangement of said coils being such that adjustment of said connection point varies the mutual relation of said windings, and means for adjusting said point of connection responsive to both voltage and current fluctuations.

25. The combination with a dynamo having a field exciting winding and another field affecting winding in series therewith, of means for connecting said windings across the dynamo at a point of adjustable potential difference, the arrangement of said coils being such that adjustment of said connection point varies the mutual relation of said windings, and means for adjusting said point of connection independently responsive to voltage and current fluctuations.

26. The combination with a dynamo having a commutator, of a field exciting winding and a field affecting winding in series with each other and in shunt across the dynamo, and means for connecting the relatively opposed ends of said windings with the commutator at adjustable points with respect to the axis of commutation.

27. The combination with a dynamo having a commutator, of a field exciting winding and a field affecting winding in series with each other and in shunt across the dynamo, means for connecting the relatively opposed ends of said windings with the commutator at adjustable points with respect to the axis of commutation, and means for controlling said connecting means responsive to fluctuations in a circuit affected by the operation of the dynamo.

28. The combination with a dynamo having a commutator, of a field exciting winding and a field affecting winding in series with each other and in shunt across the dynamo, means for connecting the relatively opposed ends of said windings with the commutator at adjustable points with respect to the axis of commutation, and means for controlling said connecting means responsive to both voltage and current fluctuations.

29. The combination with a dynamo having a commutator, of a field exciting winding and a field affecting winding in series with each other and in shunt across the dynamo, means for connecting the relatively opposed ends of said windings with the commutator at adjustable points with respect to the axis of commutation, and means for controlling said connecting means independently responsive to voltage and current fluctations.

30. The combination with a dynamo operated at varying speeds and a storage battery charged thereby, of means for controlling the operation of said dynamo comprehending a field exciting winding and another field affecting winding, means for connecting said windings with the dynamo, and means for simultaneously varying the current in both of said windings in opposite senses to vary the current supplied to the battery comprehending means for varying said connection in response to variations in condition of the battery.

31. The combination with a dynamo operated at varying speeds and a storage battery charged thereby, of means for controlling the operation of the said dynamo comprehending a field exciting winding and another field affecting winding, means for adjustably connecting said windings with said dynamo at points of different values of potential difference, and means for adjusting the point of connection to regulate the operation of the dynamo responding to variations in the condition of the storage battery.

32. The combination with a variable speed dynamo, a storage battery charged thereby and means incorporated in said dynamo tending to regulate the same to charge the battery at substantially uniform rate throughout speed changes, of electro-responsive means affected by the operation of the dynamo mechanically affecting said regulating means to assist in regulating the dynamo to produce a desired type of battery charging.

33. The combination with a storage battery and a variable speed dynamo arranged to charge the same of a type tending to supply substantially constant current throughout certain wide speed changes, of electro-responsive means for mechanically affecting said dynamo in response to changes in the electrical operation thereof.

34. The combination with a storage battery and a variable speed dynamo arranged to charge the same of a type tending to supply substantially constant current throughout certain wide speed changes, of responsive means for mechanically affecting the relation of parts of said dynamo in response to changes in the voltage thereof as determined by said battery.

35. The combination with a storage battery and a variable speed dynamo arranged to charge the same comprising field exciting means affected by the shifting of the axis of commutation upon speed changes so as to tend to produce automatic inherent regulation of the dynamo while charging the battery, of supplemental means cooperating therewith comprehending means for affecting the connection of the field exciting means with respect to the axis of commutation, to affect the inherent regulaing function in response to fluctuations in an external circuit supplied by the dynamo.

36. The combination with a storage battery and a variable speed dynamo arranged to charge the same comprising field exciting means affected by the shifting of the axis of commutation upon speed changes so as to tend to produce automatic inherent regulation of the dynamo throughout speed changes during connection with said battery, of supplemental means cooperating therewith comprehending means for affecting the connection of the field exciting means with respect to the axis of commutation, to affect the inherent regulating function in response to fluctuations in voltage in an external circuit communicating with said battery and supplied by the dynamo.

37. The combination with a variable speed generator having a commutator, an external circuit including a storage battery connected therewith, a field circuit, and means for connecting the field circuit independently with said commutator, of automatic means for varying said point of connection affected upon fluctuations in voltage of said battery.

38. The combination with a variable speed generator having a commutator, means for connecting an external circuit with said commutator, an external circuit including a storage battery connected therewith, a field circuit, and means for connecting the field circuit independently with said commutator, of automatic means for varying said point of connection affected by fluctuations in current supplied to the battery.

39. The combination with a variable speed generator having a commutator, a field exciting means, means for connecting an external circuit with said commutator, an external circuit and storage battery in connection therewith and means for connecting the field exciting means with said commutator at a point differing from that of the main circuit connection, of means for affecting the point of connection of said field exciting means to vary the excitation of the field exciting means upon changes in voltage of said battery.

40. The combination with a variable speed generator, having a commutator, a field exciting means, means for connecting an external circuit with said commutator, an external circuit and storage battery in connection therewith and means for connecting the field exciting means with said commutator at a point differing from that of the main circuit connection, of means cooperating therewith to vary the excitation of the field exciting means upon changes in voltage of said battery comprehending responsive means affected by the electrical operation of the dynamo, and means operated thereby for moving the point of connection of the field exciting means with respect to said commutator.

JOHN L. CREVELING.